United States Patent

[11] 3,568,792

| [72] | Inventor | George R. Urquhart |
| | | Bonita, Calif. |
| [21] | Appl. No. | 834,343 |
| [22] | Filed | June 18, 1969 |
| [45] | Patented | Mar. 9, 1971 |
| [73] | Assignee | Rohr Corporation |

[54] SOUND-SUPPRESSING AND THRUST-REVERSING APPARATUS
13 Claims, 6 Drawing Figs.

[52] U.S. Cl. ................................................. 181/51,
239/265.13, 239/265.19
[51] Int. Cl. ...................................................... F01n 1/08,
F01n 1/14, B64d 33/06
[50] Field of Search ............................................. 181/33,
33.06, 33.22, 33.221, 33.222, 43, 51; 239/127.3,
265.13, 265.19, 265.27

[56] References Cited
UNITED STATES PATENTS

| 2,930,185 | 3/1960 | Tyler | 181/33(.222) |
| 2,940,252 | 6/1960 | Reinhart | 181/33(.06) |
| 2,943,443 | 7/1960 | Voymas et al. | 181/33(.222) |
| 3,153,319 | 10/1964 | Young et al. | 181/33(.222) |
| 3,215,172 | 11/1965 | Ardoin | 181/33(.221) |
| 3,344,882 | 10/1967 | Bellion et al. | 181/33(.221) |
| 3,347,466 | 10/1967 | Nichols | 239/265.19 |
| 3,455,413 | 7/1969 | Henley | 181/33(.221) |

Primary Examiner—Robert S. Ward, Jr.
Attorney—George E. Pearson

ABSTRACT: Apparatus includes exhaust gas nozzle and at least two deflectors of arcuate cross section generally surrounding nozzle. Trailing edges of deflectors are serrated to form spikes. In first, retracted position, deflectors are streamlined with nacelle. In second position, leading edges of deflectors scoop in ambient air around nozzle and some spikes overlie nozzle exit to turbulize gas stream, while others intercept ambient air, causing mixing and cooling and noise reduction. In third, fully extended position deflectors join to produce reverse thrust bucket, and spikes are offset laterally to mesh and permit tight closing. Nozzle may be daisy type to also produce noise suppression.

INVENTOR.
GEORGE R. URQUHART
BY Edwin D. Grant

ATTORNEY

PATENTED MAR 9 1971

INVENTOR.
GEORGE R. URQUHART
BY Edwin D. Grant

ATTORNEY

PATENTED MAR 9 1971 3,568,792

INVENTOR.
GEORGE R. URQUHART
BY Edwin D. Grant
ATTORNEY

SOUND-SUPPRESSING AND THRUST-REVERSING APPARATUS

BACKGROUND OF THE INVENTION

This invention lies in the field of sound suppression and thrust reversal. It deals with the class of apparatus attached to a jet engine nacelle to cause mixing of an exhaust gas stream with ambient air and to reverse the direction of flow of exhaust gas to produce reverse thrust. It is directed particularly to apparatus which intercepts both exhaust gas and ambient air, causing turbulence in each and their mixing together to cool the combined gases and reduce total exhaust noise, and which also blocks rearward flow of the gas and redirects it to produce thrust opposed to the direction of movement of an airplane on which the engine is mounted.

Gas turbines, more commonly called jet engines, produce reaction thrust by ejecting a high-velocity stream of gas from the exhaust nozzle of the gas turbine. This stream creates a very high level of sound energy in a wide range of frequencies and a portion of this sound energy or "noise" reaches the ground from low flying jet airplanes, particularly those which are operating at substantially full power during takeoff, at a noise level which is not acceptable to the public. Many schemes have been proposed for reducing this noise, including modifications of the engine system itself and various types of attachments cooperating with the exhaust nozzle to modify the character of the exhaust stream.

Jet airplanes land at extremely high speeds and it is desirable to reduce the amount of work done by the wheel brakes in slowing and stopping the airplane. For this purpose, various attachments have been provided to deflect or reverse the direction of flow of the exhaust stream to provide a reverse thrust. In some cases the same devices are arranged and adapted to provide both functions.

Various devices of the kind mentioned are presently in use and accomplish their purposes to a greater or less extent, but they all suffer from drawbacks of one kind or another. Those which are relatively effective are usually heavy, complicated, and expensive to maintain. The simpler types usually produce much less than optimum results.

SUMMARY OF THE INVENTION

The present invention overcomes the difficulties mentioned above and accomplishes the functions of noise reduction and thrust reversal to a very significant degree while retaining the virtues of mechanical simplicity and light weight as well as a minimum of maintenance time and expense. Generally stated, in its generic form, the apparatus comprises a pair of deflectors which are generally arcuate in cross section transverse to the axis of the nozzle and are movably mounted on the nacelle for adjustment of a first, retracted position in which they are streamlined with the aft end of the nacelle and substantially surround the nozzle, a second position in which they scoop in ambient air to flow around the nozzle for mixing with the exhaust gas, and a third position in which they form a reverse thrust bucket to intercept the exhaust stream and redirect it laterally and forwardly. In their first, or forward, retracted position they add little or nothing to the drag because they are merely a streamlined continuation of the nacelle.

The trailing edge of each deflector is serrated to form a series or rearwardly extending spikes. Each deflector is mounted to the nacelle by some means such as a four-bar linkage and an actuator is provided to move them rearwardly successively to the second and third positions. The mounting means is so designed that in the second position the leading edge of each deflector extends laterally into the ambient slipstream to scoop in ambient air and cause it to flow rearwardly over the nozzle for mixing with the exhaust gas.

The trailing edge of each deflector is moved inwardly so that some of the spikes overlie the end of the nozzle and intercept the gas stream, while other spikes intercept the ambient air flow. Turbulence is caused in both gases so that they mix rapidly, cooling the mixture and reducing the total noise output.

When the deflectors are moved by the actuator to their third, fully extended position, the mounting means causes them to be located behind the nozzle with their trailing edges together and their leading edges outward and forward of the trailing edges, forming a bucket which correspondingly redirects the gas stream laterally and forwardly, resulting in a reverse thrust. The spikes are offset laterally on the two deflectors so that they will mesh with each other and allow complete closing of the bucket.

All that is required to accomplish the total result in two deflectors which may be made of sheet metal, a simple linkage mounting, and a simple actuator such as a hydraulic servomotor.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENT

Figure 1:
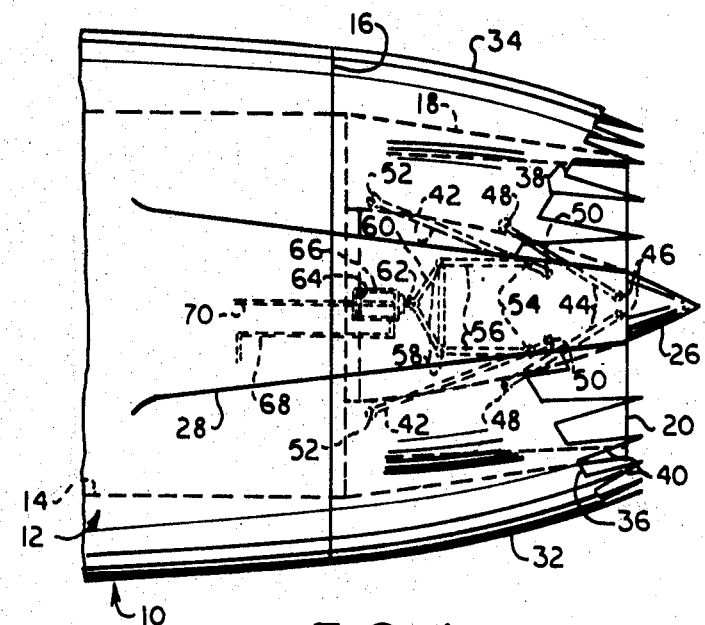
FIG. 1 is a top plan view of the aft portion of a nacelle together with an exhaust nozzle and a pair of deflectors in retracted position surrounding it.
Figure 2:
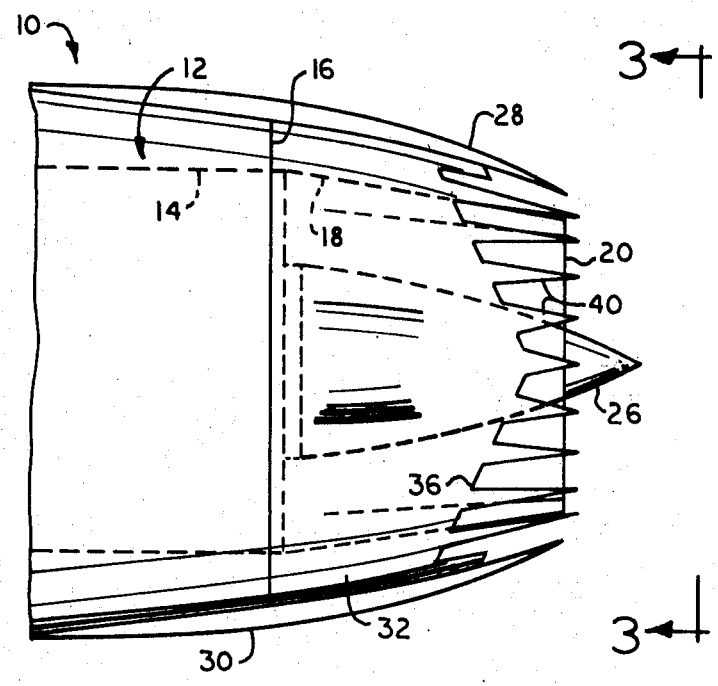
FIG. 2 is a side elevational view of the apparatus of FIG. 1.
Figure 3:
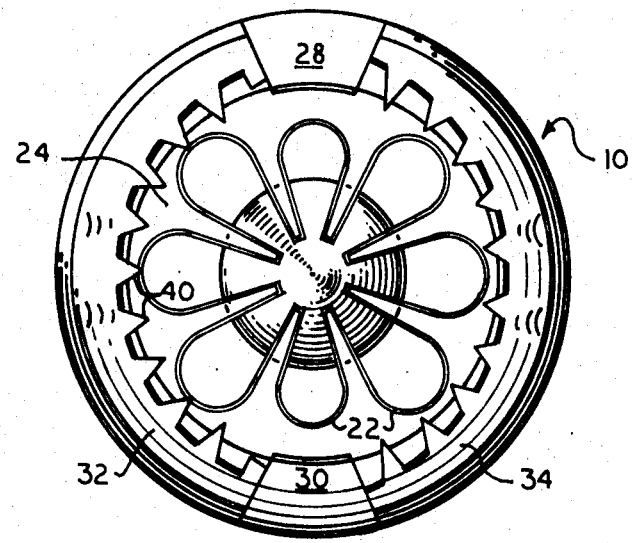
FIG. 3 is a rear elevational view of the apparatus of FIG. 1.

The total system is generally illustrated in schematic fashion in FIGS. 1, 2, and 3 with the deflectors in retracted or inoperative position. A generally streamlined nacelle 10 is provided and a jet engine, not shown, is located within the forward portion of the nacelle. The high velocity exhaust gas stream from the turbine flows rearwardly through exhaust nozzle 12 and is discharged rearwardly to produce a reactive propulsion thrust. As is well known, the shearing action between the gas stream and the relatively stationary ambient air produces very high intensity sound waves in a wide range of frequencies, the total sound energy constituting the "noise" which is in part directed toward the ground. The higher frequencies are more rapidly attenuated with distance than the lower frequencies, and the latter are generally considered to be the most disturbing or uncomfortable. Thus it is desirable to reduce the total sound power produced and also to raise the lower frequencies as much as possible into the higher ranges for less basic disturbance and also for better attenuation.

The forward portion 14 is of the nozzle adjacent to the turbine, generally referred to as a tailpipe, is of generally cylindrical form back to a transverse plane 16 which is basically the trailing edge of the nacelle. A separate section 18, which is the nozzle proper, is secured to portion 14 by suitable securing means and is provided with a gradually changing contour, starting with an annular shape at its leading edge which is gradually corrugated deeper as it reaches the trailing edge 20 to produce a plurality of angularly spaced radially extending lobes 22 to carry the exhaust gas, separated by passages 24 to receive a flow of ambient air under certain conditions. A tapered axial guide plug or innercone 26 cooperates with section 18 to control the cross-sectional area of the exhaust passage from point to point in accordance with design requirements.

The nozzle described above is similar to that disclosed in U.S. Pat. No. 2,968,150 issued to Goebel et al. on Jan. 17, 1961. As explained in that patent, a stream of exhaust gas leaving tailpipe 14 in passing through nozzle 18 is broken up into a plurality of separate jetstreams having a high velocity (sonic or supersonic) and which mingle together after they reach the ambient air and thus lower the noise level. Furthermore, the noise frequencies resulting from the several individual jets are higher than the frequencies obtained if all the gas issued as a single jet in the conventional manner.

Upper and lower vertically aligned support arms 28 and 30 are mounted rigidly to and form partial rearward continuations of nacelle 10. They are streamlined to match its contour and are tapered rearwardly as shown in FIG. 1. These arms serve to support a pair of similar deflectors 32 and 34 which are arranged in lateral opposition and cooperate, when in their first, retracted position, with arms 28 and 30 to form a streamlined shroud around nozzle 18 for minimum resistance in high-speed, high altitude flight. The deflectors have basic trailing edges 36 and 38, as best shown in FIG. 1, which are shaped to mate with each other in another adjusted position which will be described later. From each of these trailing edges project spaced spikes 40 to form serrated edges for a purpose to be described.

At its top each deflector is supported by a pair of levers 42, 44, the levers 44 being mounted by two fixed pivots 46 to support arm 28, as seen in FIG. 1. The outer ends of levers 44 are connected to the deflectors by pivots 48. Levers 42 are mounted by two fixed pivots 50 to support arm 28 and their outer ends are connected to the deflectors by pivots 52. Levers 42 are connected by pivots 54 to a pair of links 56 whose forward ends are connected by pivots 58 to the base of triangular frame 60. The front end of this frame is secured to the end of piston rod 62 operated by piston 64 slidably in the bore of cylinder 66. Pressurized fluid is supplied to the rod end of the cylinder by a pipe 68 and control valve (not shown) or to the head end of the cylinder by a pipe 70 and control valve (not shown). A similar linkage system supports and actuates the bottom of reach deflector and the servomotors are synchronized to insure simultaneous movement. The system operates in substantially the same way as the system disclosed in the Goebel et al. U.S. Pat. No. 2,968,150 previously mentioned but in the present case it is so controlled as to move and hold the deflectors in two extended positions, as will be described.

By reference to FIGS. 1, 2 and 3, it will be noted that when the deflectors are in their first, fully retracted position, they form a streamlined continuation of the nacelle to form a shroud around nozzle 18. The spikes 40 extend rearwardly and do not overlie the exits from nozzle lobes 22. Thus they do not interfere with the exhaust gas flow in normal high level flight.

During its takeoff run and climb an airplane is usually operated with its engine or engines at full power to gain altitude as rapidly as possible. Thus the effort to reduce the noise problem requires the reduction of the maximum noise level. The problem is partly alleviated by the use of the corrugated or "daisly"-type nozzle 18 whose construction and operation were described above. However, since such a nozzle cannot be changed in flight it must be designed to produce a minimum reduction in available thrust. As a result, its sound suppressing function is limited.

Figure 4:
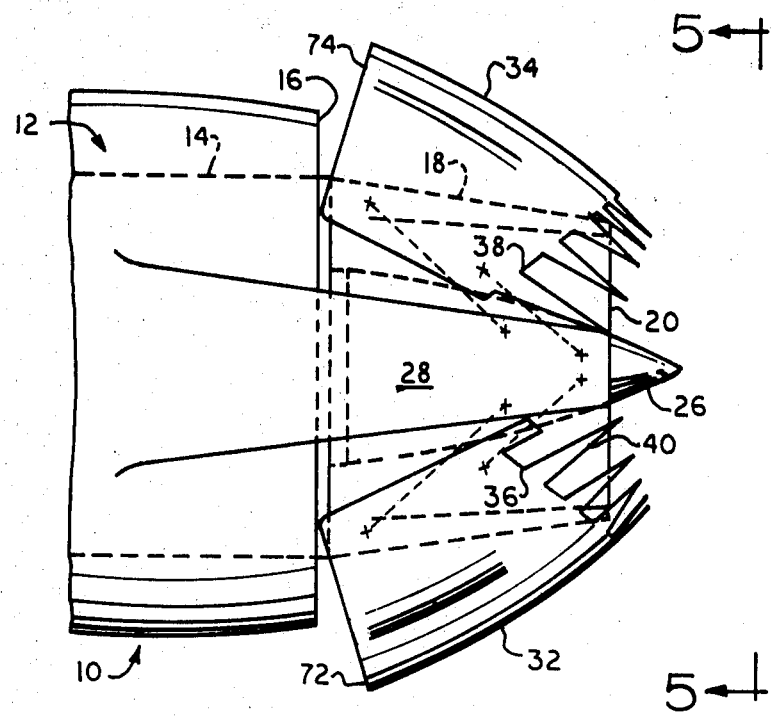
FIG. 4 is a view similar to FIG. 1 with the deflectors adjusted to sound suppressing position.
Figure 5:
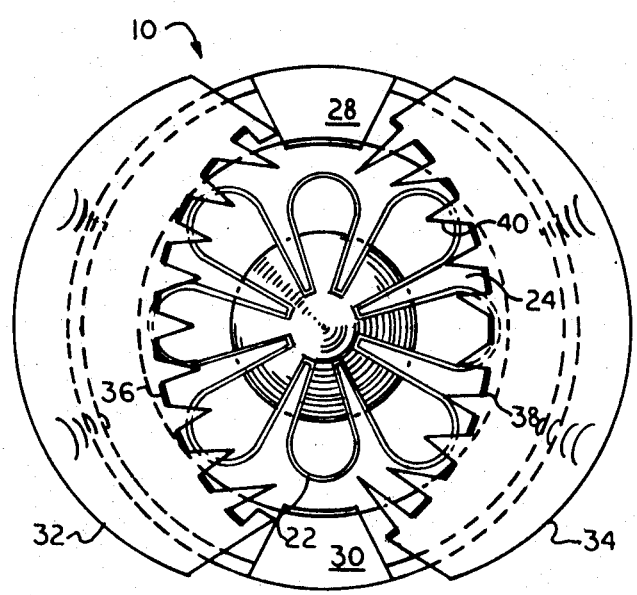
FIG. 5 is a rear elevational view of the apparatus as positioned in FIG. 4.

Since the jet noise is a major problem only during ground run and initial climb, the deflectors of this invention may be used during this limited time to greatly increase sound suppression at the expense of some thrust loss and yet cause no thrust loss during the major part of the flight. When they are moved to their second, partially or intermediately extended position, as shown in FIGS. 4 and 5, by the servomotor and four-bar linkage described above they function as sound-suppressing means. The links or levers are so dimensioned and located that the leading edges 72 and 74 are moved slightly rearwardly and substantially laterally to project into the ambient air stream and scoop in large quantities of ambient air which flows over nozzle 18 and through passages 24 to mix thoroughly with the exhaust gas stream. This mixing raises the sound frequencies and cools the gas which results in a reduction of sound power produced.

At the same time, in this intermediate position, as best seen in FIG. 5, the trailing edges 36 and 38 of the deflectors have moved both rearwardly and inwardly so that some of the spikes 40 now overlie the exits of the nozzle lobes and some overlie the air passages between and around them. In this attitude they create a tremendous amount of turbulence in both the gas stream and the air stream, raising the sound frequencies in both and enhancing the mixing of the air with the exhaust gas and thus greatly reducing the sound power developed and the amount of objectionable noise reaching the ground. There is no significant thrust loss and in some cases there is a thrust increase because of addition of the air mass. In this respect, the deflectors together form an ejector sleeve or barrel which because of the air mass passed therethrough produces both noise suppression and thrust augmentation. In addition, the air forced into the passages 24 by the ejector action prevents the base drag which would otherwise occur if the normal low pressure at the bottom of the trough passages 24 were not thus increased by the forced airflow therethrough.

While the maximum result is obtained by the combined use of the daisy nozzle and the spiked deflectors, it is to be noted that the deflectors will still perform their basic function when used with other nozzles such as conventional cylindrical ones and are intended to be so used in some installations.

Figure 6:
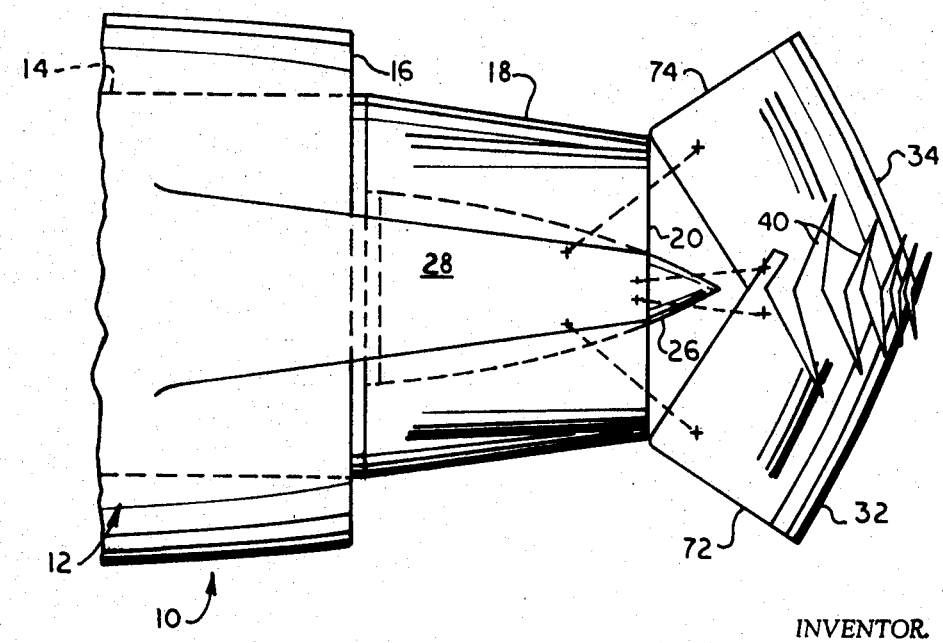
FIG. 6 is a view similar to FIG. 1 with the deflectors adjusted to thrust reversing position.

The deflectors of this invention have a dual function because they are further adjustable to a third, fully extended position in which they operated as thrust reversers. This position is shown in FIG. 6, where it will be seen that the linkage mechanism has been actuated to move the deflectors bodily rearward and also angularly inward so that they lie behind the nozzle with their trailing edges engaged. The bodies of the deflectors are angled forwardly so that their leading edges 72 and 74 lie ahead of their trailing edges. The spikes 40 of one deflector are offset laterally with respect to the spikes of the other deflector so that they mesh with each other and allow the trailing edges 36 and 38 to move into substantially sealing contact. The base of each spike at the trailing edge of each deflector is spaced from the base of each adjacent spike by a distance sufficient to accommodate the base of a meshing spike on the opposed deflector so that the substantial sealing contact can be accomplished.

With the deflectors forming a reversing bucket as shown in FIG. 6 and being located directly behind the nozzle 18 it will be seen that the gas stream will be deflected laterally and also directed forwardly to produce a thrust in opposition to the forward motion of the airplane. This reverse thrust greatly reduces the loading on the wheel brakes of the airplane during the landing run.

It will thus be seen that an apparatus has been disclosed which accomplishes the dual purpose of sound suppression and thrust reversal very effectively and yet is very light and simple, producing no loss of efficiency in flight and requiring a minimum of maintenance.

I claim:

1. Sound-suppressing and thrust-reversing apparatus for use with a jet engine mounted in a nacelle, comprising: an exhaust nozzle located at the aft end of the nacelle and adapted to receive a high-velocity exhaust gas stream from the engine and discharge it rearwardly; at least two oppositely disposed deflectors movably mounted on the nacelle; said deflectors having leading and trailing edges and being generally arcuate in cross section transversely of the axis of the nozzle and adapted in a first, retracted position to surround a major portion of the nozzle; the trailing edge of each deflector being serrated to form a plurality of rearwardly directed spikes; and actuator means adapted to move said deflectors to a second, extended position in which their leading edges extend into the slipstream to serve as scoops and direct ambient air inwardly over the exterior of the nozzle, and at least some of the spikes extend into the exhaust gas stream to cause turbulence in the flow and at least partially suppress the exhaust noise.

2. Apparatus as claimed in claim 1; at least some of the spikes intercepting the ambient air directed over the nozzle by the deflector leading edges to cause turbulence therein and mixing of the ambient air with the exhaust gas stream to further suppress the exhaust noise.

3. Apparatus as claimed in claim 1; said nozzle being longitudinally corrugated to form a plurality of angularly spaced radially extending lobes to divide the exhaust stream into a plurality of separate jet streams with ambient air flowing between them; some of the spikes in the second position overlying the outer portions of some of the lobes ad some of the spikes in the second position overlying the spaces between the lobes to produce turbulence in both the jet streams and the ambient airflow and produce maximum mixing and cooling for maximum sound suppression.

4. Apparatus as claimed in claim 1; said actuator means being further adapted to move said deflectors to a third, fully extended position rearward of the nozzle with their trailing edges in juxtaposition and their leading edges located laterally and forwardly of their trailing edges to intercept the exhaust gas flow and direct it laterally and forwardly to produce a reverse thrust.

5. Apparatus as claimed in claim 4; the spikes on one deflector being offset laterally with respect to the spikes on the other to facilitate meshing with each other and provide a substantially sealed closure engagement between the trailing edges of the deflectors.

6. Apparatus as claimed in claim 5; the base of each spike at the trailing edge of each deflector being spaced from the base of each adjacent spike by a distance sufficient to accommodate the base of a meshing spike on the opposed deflector.

7. Sound suppressing apparatus for use with a jet engine mounted in a nacelle, comprising: an exhaust nozzle located at the aft end of the nacelle and adapted to receive a high velocity exhaust gas stream from the engine and discharge it rearwardly; and turbulence producing means movably mounted on said nacelle and comprising a plurality of slender elongate members in the general form of spikes arranged generally parallel to each other and laterally spaced; said spikes being movable from a first retracted position external to the exhaust gas stream to a second position behind the nozzle and protruding at least partially into the exhaust gas stream to intercept the gas and cause local turbulence and reduce the jet noise.

8. Apparatus as claimed in claim 7; including means to introduce ambient air from the exterior of the nacelle to flow rearwardly over the nozzle; and additional spikes movable into position to intercept the airflow and cause turbulence therein and mixing of the air with the exhaust gas stream to further reduce the jet noise.

9. Apparatus as claimed in claim 8; said means to introduce ambient air comprising scoop means movable laterally of the nacelle into the ambient airstream to receive the air under ram pressure for forceful delivery over the nozzle.

10. Apparatus as claimed in claim 9; said spikes being carried by said scoop means and being adapted to move rearwardly and inwardly as said scoop means move laterally outwardly.

11. Apparatus as claimed in claim 7; said nozzle being formed to divide the exhaust stream into separate jet streams to further reduce the jet noise.

12. The method of suppressing jet engine noise on an aircraft having a pair of deflector doors movable from a stowed position on opposite sides of the engine nozzle to a deployed thrust reverser position downstream of the nozzle, comprising the steps of moving the deflector doors into an intermediate ejector position for entraining a mass of the surrounding air for mixing with the jet gases issuing from the nozzle thereby to effect a first order of sound suppression, and dividing the entrained air and the gases mixed therewith at the downstream ends of the deflectors to raise the frequency of the accompanying noise thereby to effect a second order of sound suppression.

13. The method as in claim 12 wherein the nozzle is corrugated to divide the jet stream issuing internally therefrom thereby to further suppress the noise accompanying the jet stream and wherein the ejector airstream issuing externally over the corrugated nozzle is constrained to flow in the external trough passages thereof thereby to reduce the base drag due to low pressures in said exterior passages.